United States Patent
Packer et al.

(10) Patent No.: US 10,519,777 B2
(45) Date of Patent: Dec. 31, 2019

(54) TIP MEMBER FOR BLADE STRUCTURE AND RELATED METHOD TO FORM TURBOMACHINE COMPONENT

(71) Applicant: GENERAL ELECTRIC COMPANY, Schenectdy, NY (US)

(72) Inventors: Travis J Packer, Simpsonville, SC (US); Jeffrey Clarence Jones, Simpsonville, SC (US); Nicholas William Rathay, Rock City Falls, NY (US); Ian Darnall Reeves, Easley, SC (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 15/978,932

(22) Filed: May 14, 2018

(65) Prior Publication Data
US 2019/0345826 A1  Nov. 14, 2019

(51) Int. Cl.
| | |
|---|---|
| *F01D 5/14* | (2006.01) |
| *B22F 5/04* | (2006.01) |
| *B22F 3/105* | (2006.01) |
| *F01D 5/00* | (2006.01) |
| *B23P 6/00* | (2006.01) |
| *B23K 1/00* | (2006.01) |
| *B33Y 80/00* | (2015.01) |

(Continued)

(52) U.S. Cl.
CPC ............ *F01D 5/147* (2013.01); *B22F 3/1055* (2013.01); *B22F 5/04* (2013.01); *B23K 1/0018* (2013.01); *B23P 6/007* (2013.01); *F01D 5/005* (2013.01); *B22F 2003/1057* (2013.01); *B23K 2101/001* (2018.08); *B33Y 10/00* (2014.12); *B33Y 80/00* (2014.12); *F01D 5/187* (2013.01); *F05D 2240/307* (2013.01); *F05D 2260/201* (2013.01)

(58) Field of Classification Search
None
See application file for complete search history.

(56) References Cited

U.S. PATENT DOCUMENTS

| | | | | | |
|---|---|---|---|---|---|
| 4,020,538 | A | * | 5/1977 | Dennis | ..................... B23P 15/04 29/889.721 |
| 4,232,995 | A | * | 11/1980 | Stalker | ..................... F01D 5/20 415/173.4 |

(Continued)

FOREIGN PATENT DOCUMENTS

| | | |
|---|---|---|
| EP | 2028342 B1 | 8/2016 |
| GB | 2378733 A | 2/2003 |
| WO | 2017074372 A1 | 5/2017 |

*Primary Examiner* — Michael Lebentritt
(74) *Attorney, Agent, or Firm* — Dale Davis; Hoffman Warnick LLC

(57) ABSTRACT

The disclosure relates to a tip member configured to be coupled to a blade structure for a turbomachine. A body of the tip member includes: a first surface configured to engage a radially outboard end of the blade structure, a second surface positioned opposite the first surface, and at least one perimeter sidewall positioned between the first and second surfaces, wherein the at least one perimeter sidewall has an airfoil cross-section; and an opening passing through the body from the first surface to the second surface, and having a single directional orientation therebetween, wherein the opening is sized to receive a post positioned on the radially outboard end of the blade structure.

20 Claims, 10 Drawing Sheets

(51) Int. Cl.
*F01D 5/18* (2006.01)
*B33Y 10/00* (2015.01)
*B23K 101/00* (2006.01)

(56) References Cited

U.S. PATENT DOCUMENTS

| | | | | |
|---|---|---|---|---|
| 4,519,745 A * | 5/1985 | Rosman | ............ | F01D 5/284 |
| | | | | 416/241 B |
| 5,743,322 A * | 4/1998 | Jackson | ............ | B22D 19/10 |
| | | | | 164/98 |
| 6,394,397 B1 * | 5/2002 | Ngo | ............ | B64C 27/463 |
| | | | | 244/199.3 |
| 6,413,051 B1 * | 7/2002 | Chou | ............ | B23P 6/005 |
| | | | | 416/229 A |
| 7,600,979 B2 * | 10/2009 | Steibel | ............ | C04B 35/573 |
| | | | | 416/229 A |
| 7,874,473 B2 * | 1/2011 | Heinz | ............ | B23K 1/0018 |
| | | | | 228/119 |
| 8,678,764 B1 | 3/2014 | Kimmel | | |
| 9,074,481 B2 | 7/2015 | Mahler et al. | | |
| 9,174,312 B2 | 11/2015 | Baughman et al. | | |
| 9,186,757 B2 * | 11/2015 | Munshi | ............ | F01D 5/005 |
| 10,072,503 B2 * | 9/2018 | Caldeira | ............ | F01D 5/147 |
| 10,287,896 B2 * | 5/2019 | Marcin, Jr. | ............ | F01D 5/147 |
| 2003/0143074 A1 * | 7/2003 | Tsukamoto | ............ | B23K 11/02 |
| | | | | 416/96 R |
| 2008/0089789 A1 | 4/2008 | Farineau et al. | | |
| 2012/0237355 A1 * | 9/2012 | Zhang | ............ | F01D 5/147 |
| | | | | 416/226 |
| 2013/0302166 A1 * | 11/2013 | Lee | ............ | B23P 6/002 |
| | | | | 416/95 |
| 2014/0165398 A1 | 6/2014 | Giovannetti et al. | | |
| 2014/0199174 A1 * | 7/2014 | Roberts, III | ............ | F01D 5/147 |
| | | | | 416/232 |
| 2014/0255194 A1 | 9/2014 | Jones | | |
| 2016/0303674 A1 | 10/2016 | Stankowski et al. | | |
| 2018/0304418 A1 * | 10/2018 | Wiebe | ............ | B33Y 80/00 |

* cited by examiner

TIP MEMBER FOR BLADE STRUCTURE AND RELATED METHOD TO FORM TURBOMACHINE COMPONENT

BACKGROUND

The disclosure relates generally to tip members configured to be coupled to a blade structure for a turbomachine, and additionally, to methods of forming a turbomachine component from the tip member and blade structure.

Conventional manufacture of metal components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high power melting beam, such as a 100 Watt ytterbium laser, to fully weld (melt) the metal powder to form a solid metal. The melting beam is moved or deflected in the X-Y direction, and has an intensity sufficient to fully weld (melt) the metal powder to form a solid metal. The metal powder bed may be lowered for each subsequent two dimensional layer, and the process repeats until the component is completely formed.

Although AM techniques may be used to form one or more components of a turbomachine, conventional manufacture with cast metal may offer advantages. For instance, metal casting may offer greater scalability and lower manufacturing times as compared to forming the same components through an AM system. In addition, manufacture of parts with cast metal generally offers greater scalability and faster speed for producing components with a uniform design. Turbomachine components formed from cast metal may be difficult to use in conjunction with conventionally-designed AM components, e.g., due to the need to mechanically couple the differently-manufactured components together. Conventional techniques for manufacturing cast metal structures and additively manufactured structures may not fully account for the subsequent mechanical coupling of these differently-formed parts to each other.

SUMMARY

A first aspect of the disclosure provides a tip member configured to be coupled to a blade structure for a turbomachine, the tip member including: a body including: a first surface configured to engage a radially outboard end of the blade structure, a second surface positioned opposite the first surface, and at least one perimeter sidewall positioned between the first and second surfaces, wherein the at least one perimeter sidewall has an airfoil cross-section; and an opening passing through the body from the first surface to the second surface, and having a single directional orientation therebetween, wherein the opening is sized to receive a post positioned on the radially outboard end of the blade structure.

A second aspect of the disclosure provides a turbomachine component including: a blade structure having a root, a radially outboard end positioned opposite the root, and an airfoil portion extending between the root and the radially outboard end; a post coupled to the radially outboard end of the blade structure, and extending at least partially radially outward relative to the blade structure; and a tip member positioned on the blade structure, wherein the tip member includes: a first surface engaging the radially outboard end of the blade structure; a second surface positioned opposite the first surface, at least one perimeter sidewall positioned between the first and second surfaces, wherein the at least one perimeter sidewall of the tip member and the airfoil portion of the blade structure form a single airfoil profile, and an opening passing through the tip member from the first surface to the second surface, and having a single directional orientation therebetween, wherein the post is positioned within the opening of the tip member.

A third aspect of the disclosure provides a method of forming a turbomachine component, the method including: providing a tip member, the tip member including: a first surface configured to engage an outboard end of a blade structure, a second surface positioned opposite the first surface, at least one perimeter sidewall positioned between the first and second surfaces, wherein the at least one perimeter sidewall has an airfoil cross-section, and an opening passing through the tip member from the first surface to the second surface, and having a single directional orientation therebetween, wherein the opening is sized to receive a post positioned on the outboard end of the blade structure; positioning the post of the blade structure through the opening of the tip member to mount the tip member on the outboard end of the blade structure; and mechanically coupling the second surface of the tip member to the post to form the turbomachine component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a tip member configured to be coupled to a blade structure to form a turbomachine component. The tip member includes a body having a first surface for engaging an outboard end of the blade structure, a second surface positioned opposite the first surface, and at least one perimeter sidewall between the first and second surfaces to form an airfoil cross-section. The tip member includes an opening passing at least partially through the body from the first surface, and sized to receive a post positioned on the outboard end of the blade structure. According to further embodiments, an airfoil component may include the tip member coupled to the blade structure through one or more metallurgical bonds, e.g., between the post of the blade structure and the surface of the tip member. Methods according to the disclosure include coupling the tip member to the blade structure after placing the post of the blade structure within the opening of the tip member. The disclosure provides a structure and method for mechanically coupling cast metal blade structures to additively manufactured tip members configured for use with the blade structure.

Figure 1:
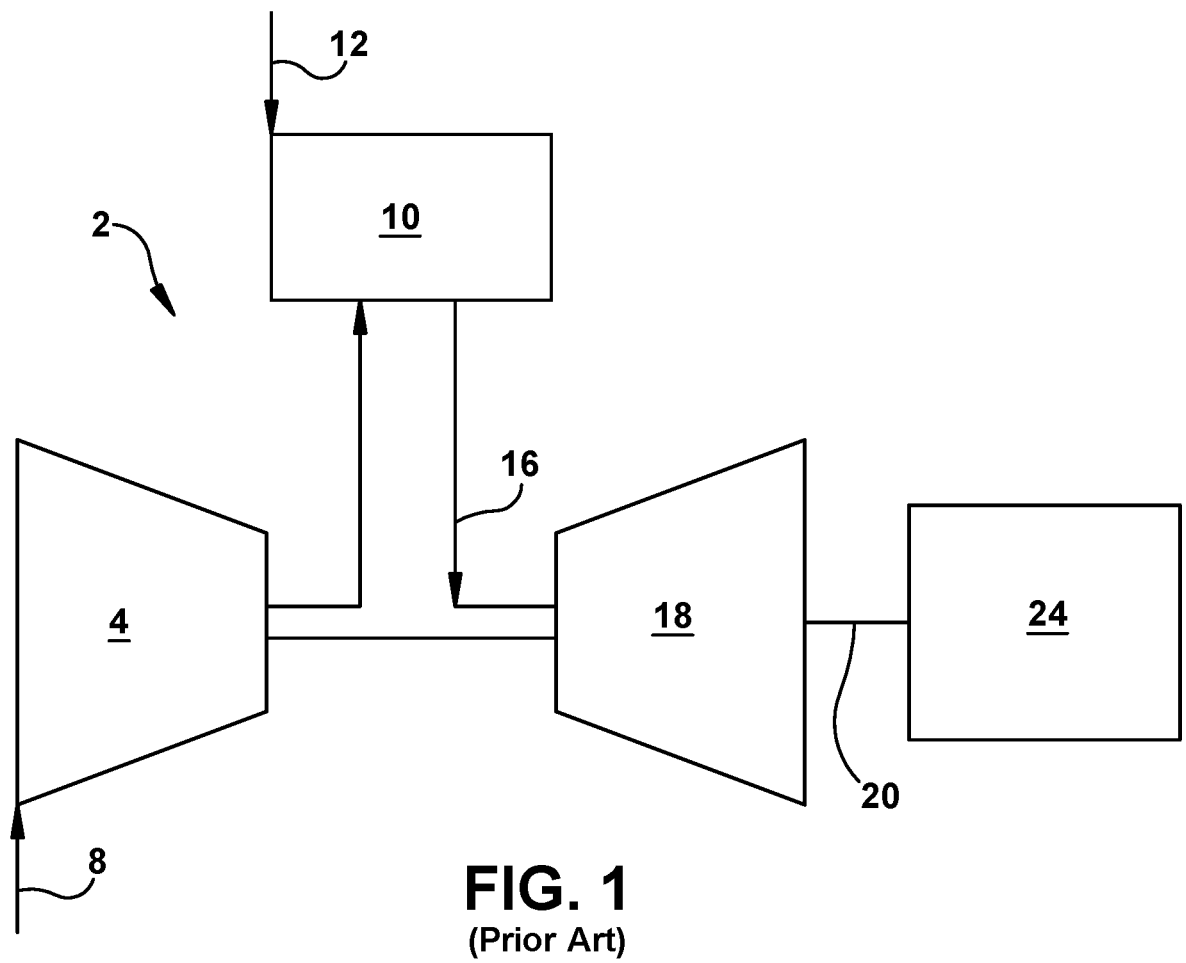
FIG. 1 is a schematic diagram of an illustrative industrial machine having a hot gas path component in the form of a gas turbine system.

Referring now to the drawings, in which like numerals refer to like elements throughout the several views, FIG. 1 shows a schematic view of an illustrative industrial machine in the form of a gas turbine system 2. While the disclosure will be described relative to gas turbine system 2, it is emphasized that the teachings of the disclosure are applicable to any industrial machine having a hot gas path component requiring cooling. Gas turbine system 2 may include a compressor 4. Compressor 4 compresses an incoming flow of air 8, and delivers the compressed flow of air 8 to a combustor 10. Combustor 10 mixes the compressed flow of air 8 with a pressurized flow of fuel 12 and ignites the mixture to create a flow of combustion gases 16. Although only a single combustor 10 is shown, gas turbine system 2 may include any number of combustors 10. Flow of combustion gases 16 is in turn delivered to a turbine 18. Flow of combustion gases 16 drives turbine 18 so as to produce mechanical work. The mechanical work produced in turbine 18 drives compressor 4 via a shaft 20 and an external load 24 such as an electrical generator and the like.

Gas turbine system 2 may use natural gas, liquid fuels, various types of syngas, and/or other types of fuels and blends thereof. Gas turbine system 2 may be any one of a number of different gas turbine engines offered by General Electric Company of Schenectady, N.Y. and the like. Gas turbine system 2 may have different configurations and may use other types of components. Teachings of the disclosure may be applicable to other types of gas turbine systems and or industrial machines using a hot gas path. Multiple gas turbine systems, or types of turbines, and or types of power generation equipment also may be used herein together.

Figure 2:
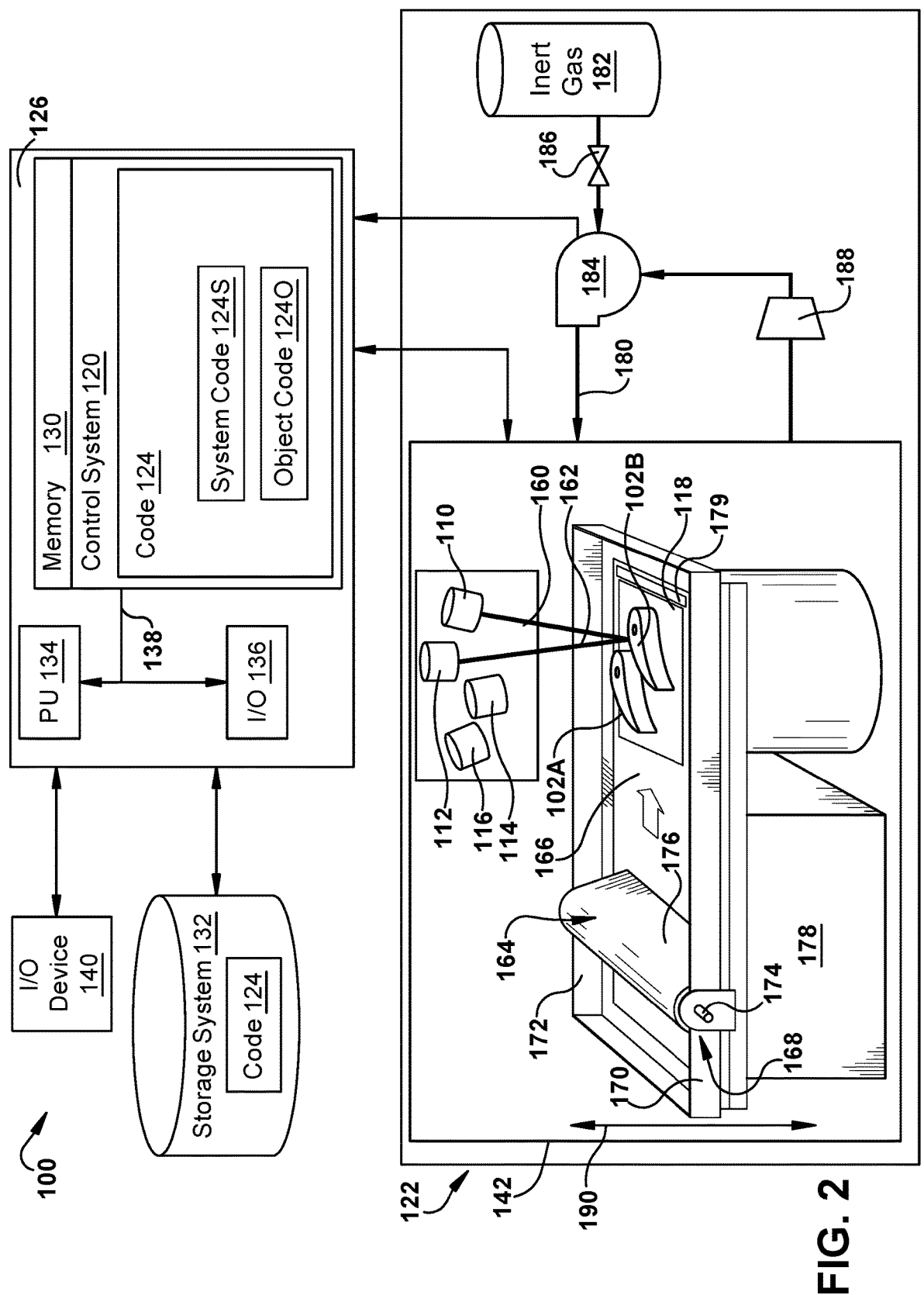
FIG. 2 shows a block diagram of an additive manufacturing system and process including a non-transitory computer readable storage medium storing code representative of a tip member according to embodiments of the disclosure.

FIG. 2 shows a schematic/block view of an illustrative computerized metal powder additive manufacturing system 100 (hereinafter 'AM system 100') for initially generating additively manufactured (AM) component(s) 102, separately labeled as 102A and 102B in FIG. 2. AM component 102 may include one large AM component or multiple AM components, e.g., two AM components 102A, 102B as shown, of which only a single layer is shown. The teachings of the disclosure may be applied to AM component(s) 102 built using AM system 100. AM system 100 uses multiple melting beam sources, e.g., four lasers 110, 112, 114, 116, but it is emphasized and will be readily recognized that the teachings of the disclosure are equally applicable to build multiple AM components 102 or a single AM component 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. AM component(s) 102 are illustrated in FIG. 2 as elements with the geometrical profile of an airfoil; however, it is understood that the additive manufacturing process can be readily adapted to manufacture any shaped AM component, a large variety of AM components and a large number of AM components having internal openings and formed on a build platform 118.

AM system 100 generally includes a metal powder additive manufacturing control system 120 ("control system") and an AM printer 122. As will be described, control system 120 executes set of computer-executable instructions or program code 124 to generate AM component(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O)interface 136, and a bus 138. Further, computer 126 is shown in communication with an external I/O device/resource 140 and storage system 132.

In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate AM component(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining AM component(s) 102 to be physically generated by AM printer 122. As described herein, additive manufacturing processes begin with a non-transitory computer readable storage medium (e.g., memory 130, storage system 132, etc.) storing program code 124. Set of computer-executable instructions for operating AM printer 122 may include any now known or later developed software code capable of operating AM printer 122.

Object code 124O defining AM component(s) 102 may include a precisely defined 3D model of an AM component 102 and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of AM component(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code 124O representative of AM component(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing AM component(s) 102 into a series of thin slices that assembles using AM printer 122 in successive layers of material.

AM printer 122 may include a processing chamber 142 that is sealed to provide a controlled atmosphere for AM component(s) 102 printing, e.g., a set pressure and temperature for lasers, or a vacuum for electron beam melting. Build platform 118, upon which AM component(s) 102 is/are built, is positioned within processing chamber 142. A number of melting beam sources 110, 112, 114, 116 are configured to melt layers of metal powder on build platform 118 to generate AM component(s) 102. While four melting beam sources 110, 112, 114, 116 will be described herein, it is emphasized that the teachings of the disclosure are applicable to a system employing any number of sources, e.g., 1, 2, 3, or 5 or more.

Continuing with FIG. 2, an applicator 164 may create a thin layer of raw material 166 spread out as the blank canvas from which each successive slice of the final AM component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 may take a variety of forms. In one embodiment, applicator 164 may include a member 176 configured to move along opposing rails 170, 172, and an actuator element (not shown in FIG. 2) in the form of a tip, blade or brush configured to spread metal powder evenly over build platform 118, i.e., build platform 118 or a previously formed layer of AM component(s) 102, to create a layer of raw material. The actuator element may be coupled to member 176 using a holder (not shown) in any number of ways.

The process may use different raw materials 166 in the form of metal powder. Raw materials 166 may be provided to applicator 164 in a number of ways. In one embodiment, shown in FIG. 2, a stock of raw material 166 may be held in a raw material source 178 in the form of a chamber accessible by applicator 164. In other arrangements, raw material may be delivered through applicator 164, e.g., through member 176 in front of its applicator element and over build platform 118. In any event, an overflow chamber 179 may be provided on a far side of applicator 164 to capture any overflow of raw material not layered on build platform 118. In FIG. 2, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM component(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182, and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam source(s) 110, 112, 114, 116 to sequentially melt layers of metal powder on build platform 118 to generate AM component(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Figure 3:
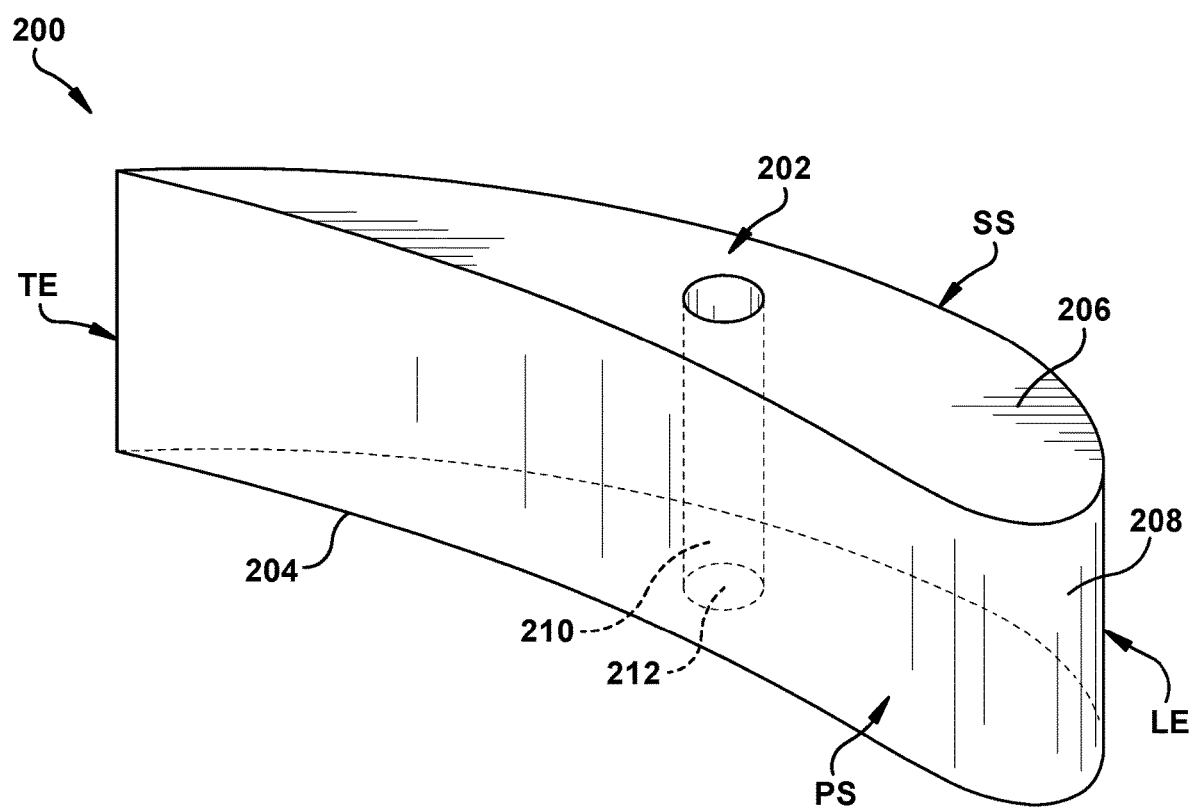
FIG. 3 shows a perspective view of an embodiment of a tip member configured to be coupled to a blade structure according to embodiments of the disclosure.

FIG. 3 shows an example of a tip member 200, which may take the form of one or more of AM components 102 (FIG. 2) discussed elsewhere herein. Tip member 200 may be made by any metal powder additive manufacturing process, such as that described relative to FIG. 2. Tip member 200 may be made using any of the above-described metal powders. According to further embodiments, tip member 200 may include one or more cast metals and/or non-additively manufactured materials. Such materials may be used in conjunction with, or as a substitute for, one or more of the various example laser-sinterable metals and/or other additively manufactured materials discussed elsewhere herein. In such cases, tip member 200 may include aluminum, titanium, nickel, cobalt, iron, and/or other currently known or later developed metals. Cast metals may also include one or more of stainless steel, steel-based composite materials, alloys, superalloys, and/or other materials which may be formed by casting. In any case, tip member 200 includes a body 202 which may be shaped for placement on a blade structure (e.g., blade structure 220 (FIG. 5)) where tip member 200 is used. According to the example of FIG. 3 and as discussed herein, body 202 provides the shape of an airfoil structure. Tip member 200 may be any form of hot gas path (HGP) component such as a turbomachine blade or nozzle, but it is understood that tip member 200 may alternatively take the form of an airfoil component for another portion of a gas turbine, steam turbine, and/or other turbomachine assembly. Body 202 may include one or more laser-sintered metals usable in additive manufacture (AM) as described elsewhere herein. Body 202 of tip member 200 includes multiple surfaces each configured for engagement with other components and/or forming one part of a single turbomachine component. A first surface 204 of body 202 may be configured to engage a radially outboard end of a blade structure in a turbomachine. The term "radially" in the context of a turbomachine component refers to the line of travel leading toward or away from the centerline axis of the turbomachine. In the case of a blade extending outward from the turbomachine's centerline axis, a length of the blade may extend substantially along the radial direction. A radially "outward" or "outboard" direction refers to the heading facing away from the axis of rotor 20 (FIG. 1), while the radially "inward" or "inboard" direction refers to the heading facing toward the axis of rotor 20. First surface 204 provides a radially inboard surface of body 202, and may be shaped to provide the cross-sectional geometry of an airfoil including pressure side and suction side surfaces. A second surface 206 may be positioned opposite first surface 204, e.g., thereby providing an outboard surface of body 202.

First and second surfaces 204, 206 may have an identical or substantially similar shape. In embodiments where the cross-section of body 202 magnifies, shrinks, tapers, etc., between surfaces 204, 206, each surface 204, 206 may have substantially the same geometrical profile.

Body 202 may include one or more perimeter sidewalls 208 positioned between first and second surfaces 204, 206. One perimeter sidewall 208 is shown to extend continuously about body 202 of tip member 200, but body 202 may include multiple perimeter sidewalls 208 in further embodiments. Regardless of how many perimeter sidewalls 208 are included on body 202, the shape of perimeter sidewall(s) 208 may have an airfoil cross-section configured for deployment within a fluid flowpath. For example, perimeter sidewall(s) 208 may include one or more of, e.g., a leading edge LE, a trailing edge TE, a suction side surface SS, and a pressure side surface PS. Pressure side surface PS and suction side surface SS may be distinguished from each other based on whether fluids flowing across tip member 200 exert positive or negative resultant pressures against the corresponding portion(s) of perimeter sidewall(s) 208.

Tip member 200 may be configured for attachment to a partial blade structure formed from, e.g., cast metal as described elsewhere herein. To allow for physical coupling of tip member 200 to a portion of a blade structure, and to allow metallurgical bonds to be formed, tip member 200 may include one or more openings 210 therein. Opening(s) 210 may pass through body 202 from first surface 204 to second surface 206. Opening(s) 210 thereby forms a passage completely through body 202 of tip member 200. Opening(s) 210 of body 202 may be formed to have a single directional orientation between surfaces 204, 206. A single directional orientation, as used herein, refers to a passage shaped such that a single line of sight or linear reference line can be drawn from one end of opening(s) 210 to the other. It is therefore understood that opening(s) 210 may include surface features (dimples, grooves, slots, protrusions, etc.) on its sidewalls while maintaining a single directional orientation through body 202. In an example, opening(s) 210 may be oriented substantially perpendicularly with respect to the plane of first surface 204, but other orientations are possible as described herein. First opening(s) 210 may include a first port 212 on first surface 204 with a predetermined cross-sectional area and geometrical profile. First port 212 of opening 210 may be sized to receive a complementarily-shaped post positioned on the end of a blade structure, as shown and described elsewhere herein. The size of first port 212 and opening 210 thus may be dependent on the size of a post to be inserted therein. In an example, opening 210 may have a circular cross-section, a triangular cross-section, a quadrilateral cross-section, and/or any other multi-sided cross-section or combination of cross-sections appropriate for use with a post of a blade structure. Opening(s) 210 may extend completely between first surface 204 and second surface 206 of body 202 as noted herein. Opening(s) 210 thus may include a second port 214 on second surface 206, in addition to first port 212 on first surface 204.

Figure 4:
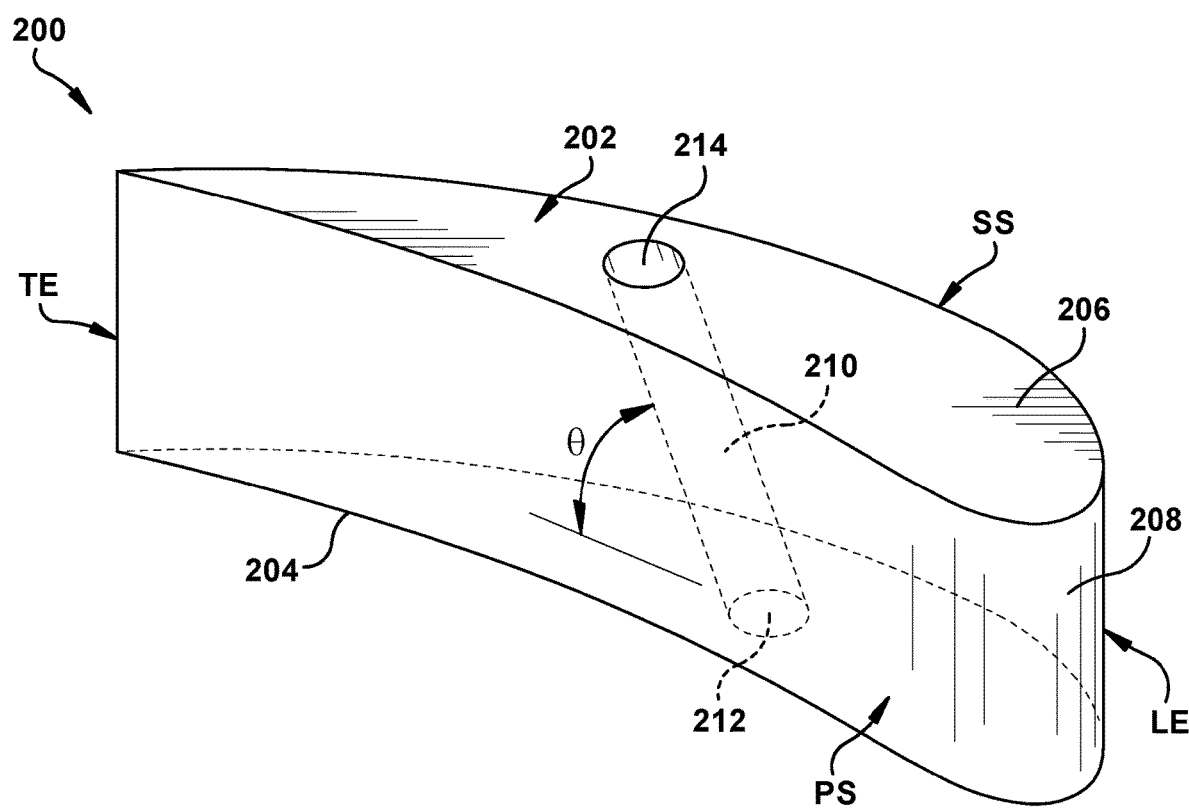
FIG. 4 shows a perspective view of another embodiment of a tip member configured to be coupled to a blade structure according to embodiments of the disclosure.

Referring now to FIG. 4, opening(s) 210 may be oriented at a non-perpendicular angle θ with respect to the plane of first surface 204 of body 202. Opening(s) 210 extending at angle θ may receive post(s) which have the same orientation (e.g., angle θ) with respect to tip member 200. In some cases, opening(s) 210 may include several orientations with respect to the plane of surface(s) 204, 206. In some cases, tip member 200 may have multiple opening(s) 210, each with a distinct angle θ with respect to surface(s) 204, 206. As noted elsewhere herein, opening(s) 210 extending at angle θ with respect to first surface 204 may enhance the mechanical coupling between body 202 and other structures shaped to receive body 202, e.g., blade structure(s) 220 (FIG. 5) discussed herein.

Figure 5:
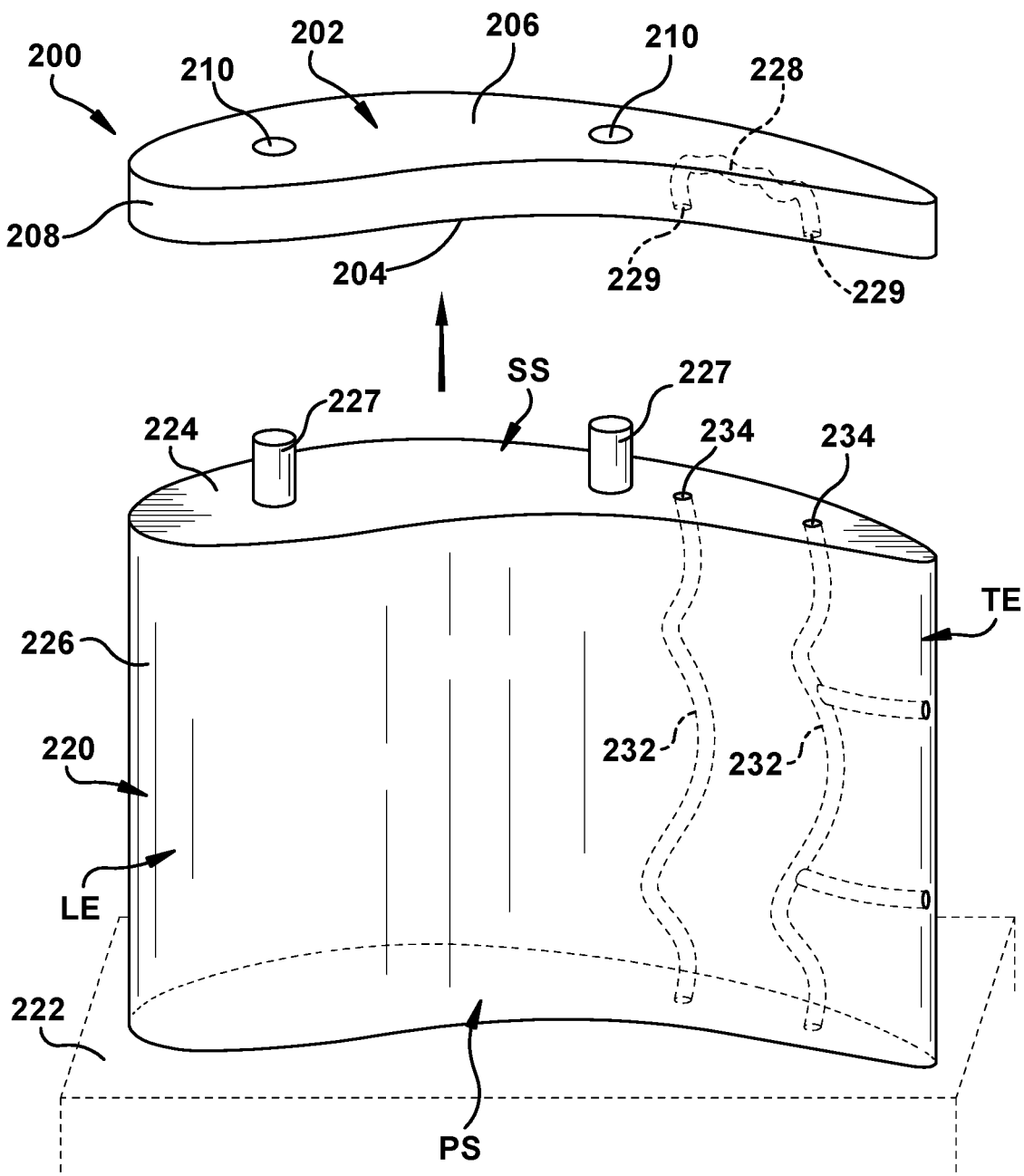
FIG. 5 shows a perspective view of a tip member and a blade structure undergoing a method to form a turbomachine component according to embodiments of the disclosure.

Turning to FIG. 5, tip member 200 is shown with a blade structure 220 of a turbomachine. Tip member 200 and blade structure 220 may be used together to provide a single turbomachine component as discussed herein. Blade structure 220 may be formed of a cast metal as described elsewhere herein, and may initially lack radially outboard surface structures, cooling circuit regions, etc. Tip member 200 thus may provide a modular component manufactured to include one of a several possible outboard surface features, cooling circuit regions, etc., so that blade structure 220 may be used with one of many possible tip members 200.

Blade structure 220 may include a root 222 positioned at the radially inboard end of blade structure 220. Root 222 may be configured for coupling to a wheel, diaphragm, and/or other moving or stationary component of a turbomachine configured for attachment to rotor 20 (FIG. 1) and/or chamber sidewall. Root 222 may include dovetails, fasteners, and/or other features (not shown) configured to mechanically couple blade structure 220 to other portions of a turbomachine. A radially outboard end 224 of blade structure 220 may be positioned opposite root 222. An airfoil portion 226 of blade structure 220 may extend between root 222 and outboard end 224 of blade structure 220. Airfoil portion 226 may include leading edge LE, trailing edge, TE, pressure side surface PS, and suction side surface SS configured for placement within a fluid flowpath. As discussed elsewhere herein, airfoil portion 226 of blade structure 220 and perimeter sidewall 208 of tip member 200 may together form a single airfoil profile after tip member 200 is coupled to blade structure 220.

Outboard end 224 of blade structure 220 may lack one or more features typically included in a complete blade structure of a turbomachine component (e.g., a shroud, a tip fillet, a radially outermost airfoil region, etc.) and thus may not be suitable for use in a fluid flowpath without being connected to tip member 200. However, blade structure 220 may include other structural features configured for mechanical coupling to tip member(s) 200. Blade structure 220 is thus configured to receive one of several tip members 200 thereon, to create a variety of turbomachine components from a singular blade structure 220.

Blade structure 220 may include one or more posts 227 coupled to outboard end 224 of blade structure 220. Each post 227 may extend radially, or at least partially radially, outward relative to blade structure 220. Post(s) 227 may have substantially the same orientation of corresponding opening(s) 210 of tip member 200. FIG. 5 depicts posts 227 as extending perpendicularly with respect to first surface 204 of tip member 200 and outboard end 224 of blade structure 220, respectively. In other embodiments discussed herein, some post(s) 227 may extend non-perpendicularly from outboard end 224 of blade structure 220. The length of each post 227 above outboard end 224 may be substantially the same as the length of each opening(s) 210 sized to receive post(s) 227 therein.

As will be discussed in further detail herein, tip member 200 and blade structure 220 may be mechanically coupled to each other to form a single turbomachine component. The resulting turbomachine component may include at least two kinds of material, e.g., laser-sintered metals in tip member 200 and cast metal in blade structure 220. Embodiments of tip member 200 and blade structure 220 may provide various interior and/or exterior structural features upon deployment in a turbomachine. Cooling circuits are one type of interior structural feature which may be included in a turbomachine component. Embodiments of tip member 200 may be configured to provide a cooling circuit when coupled to blade structure 220. For instance, tip member 200 may include a first cooling passage 228 (shown in FIG. 5) in the form of a passageway through body 202 separate from opening(s) 210. First cooling passage 228 may not be configured for post(s) 227 to pass therethrough, and instead may be sized to transmit one or more cooling fluids (e.g., liquid and/or gas refrigerants, air or gas routed from a cooling fluid reservoir and/or other portions of a turbomachine (e.g., compressor 4)) through tip member 200 and absorb heat therefrom.

First cooling passage 228 may be shaped to form only one part of a larger cooling circuit. That is, first cooling passage 228 may be shaped to interconnect with other cooling passages in other structures (e.g., blade structure 220) such that cooling fluid(s) circulate partially through first cooling passage 228 after tip member 200 is deployed. To provide this feature, first cooling passage 228 may include one or more connecting passages 229 positioned on body 202, e.g., at first surface 204. Connecting passage 229 may be shaped and positioned to permit fluid communication between first cooling passage 228 and other cooling passages outside tip member 200, e.g., within blade structure 220. For example, blade structure 220 may include one or more second cooling passages 232 therein for directing cooling fluid(s) to portions of blade structure 220 in need of cooling. Second cooling passage(s) 232 may include one or more connecting passage(s) 234, e.g., on outboard end 224. Connecting passages 234 may be positioned and shaped to fluidly connect to first cooling passage 228 and/or other passages outside blade structure 220. In the example of FIG. 5, connecting passage(s) 234 of second cooling passage 232 may be positioned on outboard end 224 and substantially aligned with connecting passages 229 of first cooling passage 228 formed in tip member 200. First and second cooling passages 228, 232 may together form a single cooling circuit for transmitting cooling fluid(s) amongst portions of tip member 200 and blade structure 220. During operation, cooling fluid(s) may be directed into first or second cooling passages 228, 232 to absorb heat from tip member 200 and/or blade structure 220 before traveling to the other passage(s) to absorb heat from other materials and/or regions. The interchangeability of tip member 200 may allow first cooling passage 228 to be shaped differently within each tip member 200, and provide greater versatility and/or cooling effectiveness for different applications. In an example implementation, one tip member 200 on blade structure 220 may be exchanged for another tip member 200 with different first cooling passage(s) 228. This may allow blade structure 220 to be deployed more easily at a different turbomachine stage, and/or adapted for operation under different settings.

Figure 6:
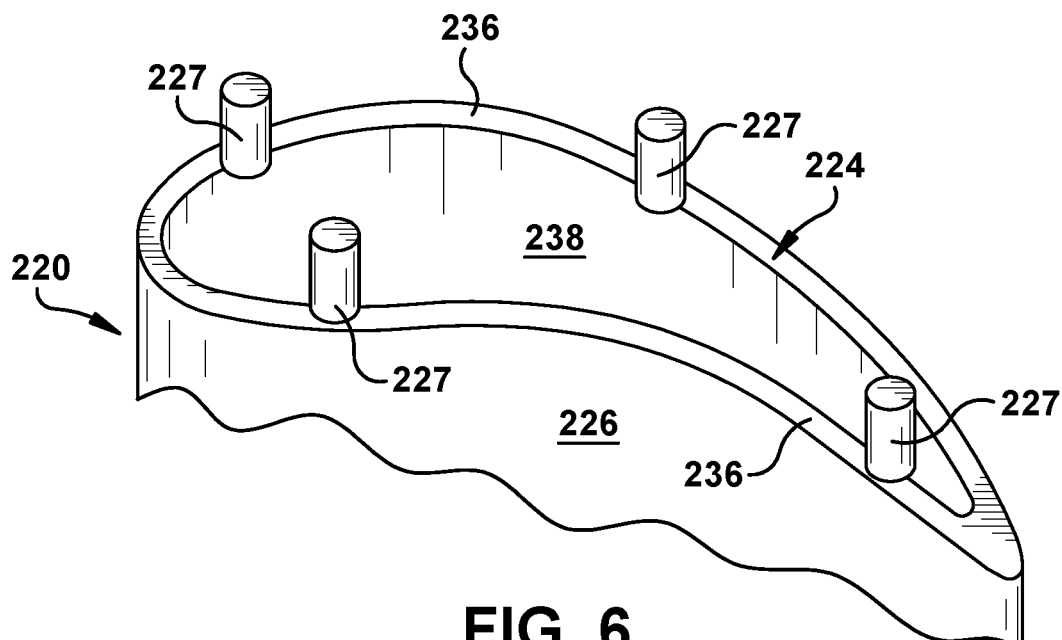
FIG. 6 shows a perspective view of a blade structure and posts for coupling to a tip member on a perimeter sidewall thereof according to embodiments of the disclosure.

FIG. 6 provides an embodiment of blade structure 220 and posts 227 according to one configuration. In some turbomachines, airfoil portion 226 may include an interior sidewall 236 defining an internal cavity 238 of blade structure 220. Internal cavity 238 may provide a single passageway through the interior of blade structure 220, e.g., for cooling fluids to pass through blade structure 220. Each post 227 of blade structure 220 may be positioned on interior sidewall 236. Posts 227 thus may surround internal cavity 238 on outboard end 224 of blade structure 220.

Figure 7:
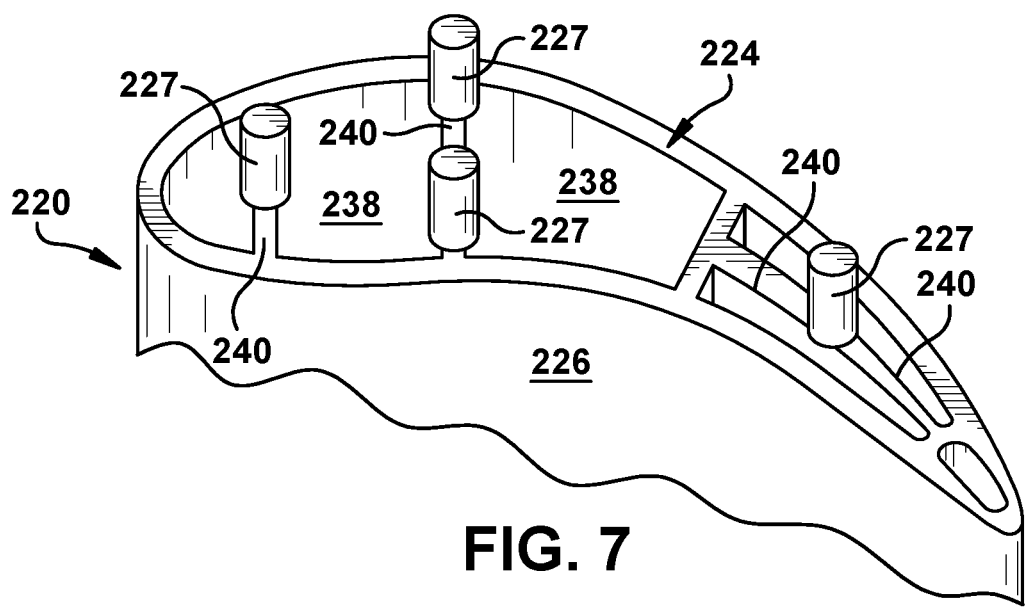
FIG. 7 shows a perspective view of a blade structure and posts for coupling to a tip member on internal ribs thereof according to embodiments of the disclosure.

FIG. 7 provides an embodiment of blade structure 220 and posts 227 according to a configuration which may be provided together with, or separately from, other configurations discussed herein. Blade structure 220 in some cases may include multiple internal cavities 238 (e.g., cooling circuits, impingement passages, etc.) separated by a set of airfoil ribs 240. Each airfoil rib 240 may provide a physical boundary between each internal cavity 238 within blade structure 220. In this case, post(s) 227 may be formed on one or more internal ribs 240 at the radially outboard end 224 of blade structure 220 to prevent interference with fluids passing through each internal cavity 238.

Figure 8:
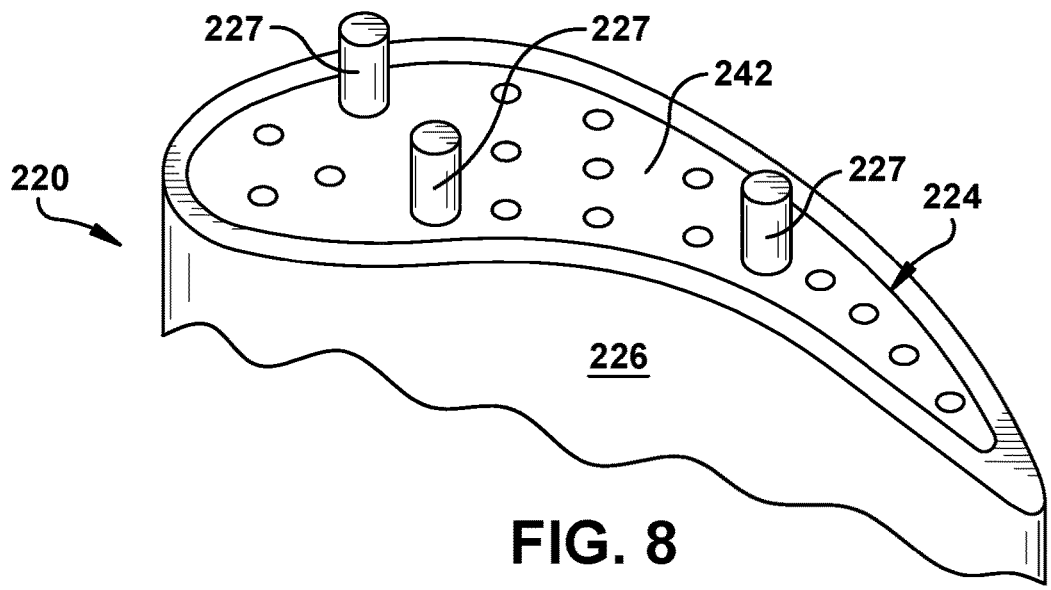
FIG. 8 shows a perspective view of a blade structure and posts for coupling to a tip member on an impingement cap thereof according to embodiments of the disclosure.

FIG. 8 provides yet another configuration of blade structure 220 and posts 227, which may be used together or separately with other configurations discussed herein. In some cases, blade structure 220 may include an impingement cap 242 positioned over internal cavity 238 (FIGS. 6, 7) to provide a fluid seal. Posts 227 may be formed with impingement cap 242 as a single component for fluid sealing of impingement circuits within blade structure 220. Posts 227 of impingement cap 242 may independently allow coupling of blade structure 220 to tip member 200.

Figure 9:
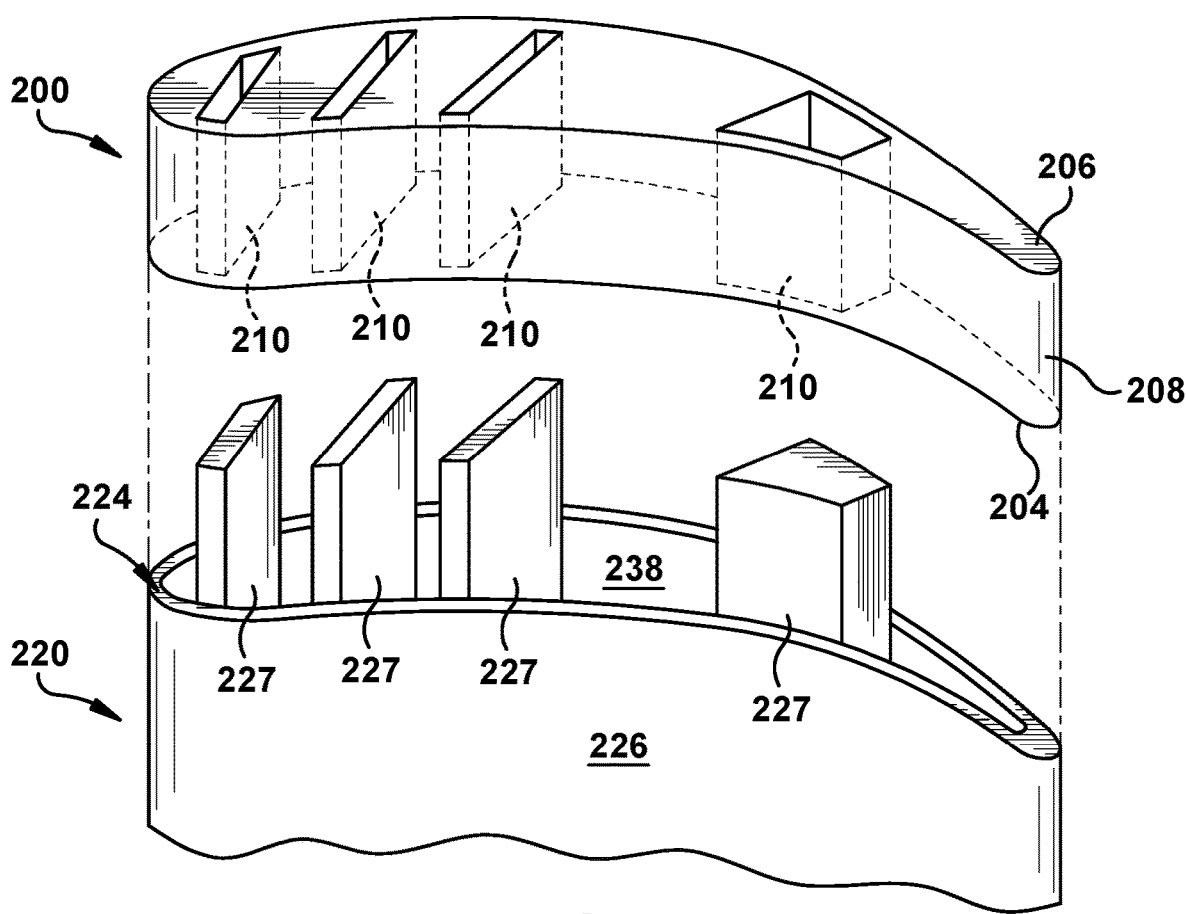
FIG. 9 shows a perspective view of a tip member being positioned on internal ribs of a blade structure, which include posts as a portion thereof, according to embodiments of the disclosure.

Referring now to FIG. 9, it is possible for posts 227 to form part of one or more other components of blade structure 220. FIG. 9 in particular provides an embodiment in which post(s) 227 and internal rib(s) 240 (FIG. 7) are provided as a single structure. As shown, post(s) 227 may extend from within internal cavity 238 of blade structure 220 to a radial end positioned outside blade structure 220. Post(s) 227 may provide the additional function of separating internal cavities 238 from each other. In this case, opening(s) 210 (in phantom) of tip member 200 may be shaped to accommodate the larger size of post(s) 227 extending from within internal cavity 238. It is understood that blade structure(s) 220 may optionally include some posts(s) 227 positioned outside internal cavity 238 together with post(s) 227 which pass through internal cavity 238.

Figure 10:
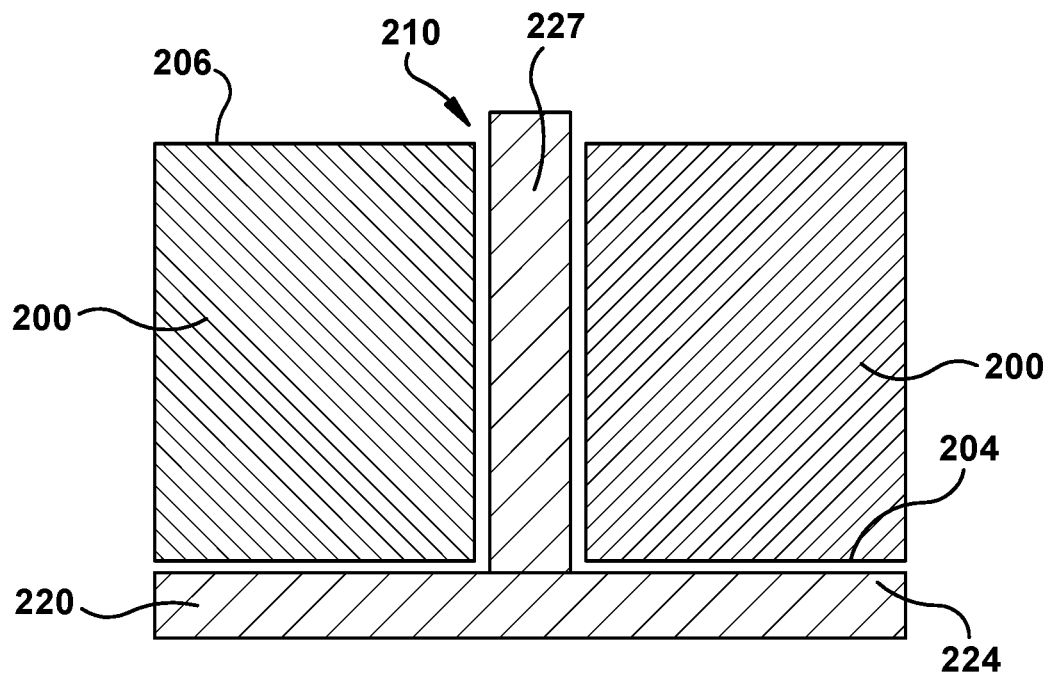
FIG. 10 shows a cross-sectional view along line 10-10 of FIG. 12 of a post positioned within an opening of a tip member according to embodiments of the disclosure.

Referring to FIG. 10, the disclosure includes methods of mechanically coupling tip member(s) 200 to blade structure(s) 220 (FIGS. 4-9) with the aid of post(s) 227. FIG. 10 provides a cross-sectional view along line 10-10 of FIG. 12, discussed below. The cross-sectional view of tip member 200 and post 227 of blade structure 220 in FIG. 10 depicts one step of a method to form a turbomachine component. Opening 210 of tip member 200 may be sized to receive post 227 of blade structure 220 therein. For example, opening 210 may have a slightly larger cross-sectional area, diameter, etc., than post 227. One embodiment may feature opening 210 with a diameter of, e.g., approximately 0.50 meters, while post 227 may have a diameter of, e.g., approximately 0.48 meters to provide a close fit between opening 210 and post 227 inserted therein. First surface 204 of tip member 200 may physically engage outboard end 224 of blade structure 220 when post 227 is inserted into opening 210. Post 227 in some cases may initially lack additional mechanical fasteners, coupling, and/or other components for mechanically coupling post 227 to tip member 200. As discussed elsewhere herein, e.g., relative to FIGS. 12 and 13, further embodiments of opening(s) 210 and/or post(s) 227 may include structural features to aid mechanical coupling and metallurgical bonding of post(s) 227 to tip member 200.

Figure 11:
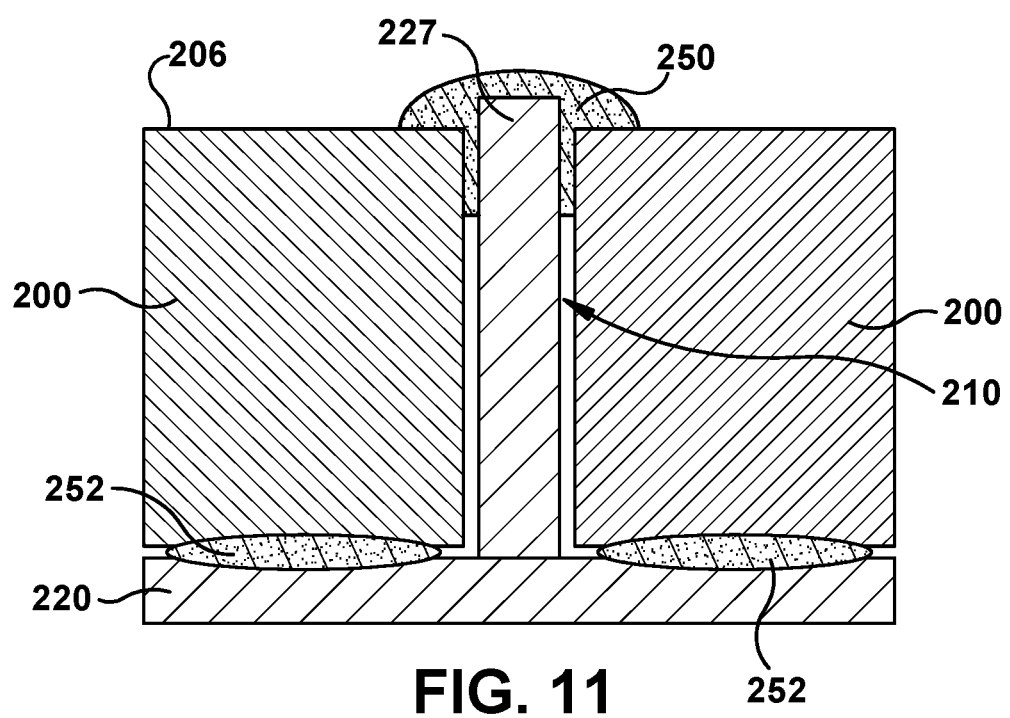
FIG. 11 shows a cross-sectional view of FIG. 10 of a process to form metallurgical bonds between the tip member and blade structure according to embodiments of the disclosure.

Turning now to FIG. 11, tip member 200 and post 227 of blade structure 220 may be treated to mechanically bond tip member 200 to blade structure 220, e.g., at opening 210. According to an example, tip member 200 and blade structure 220 may be processed to form a single turbomachine component by forming a first metallurgical bond 250. First metallurgical bond may be formed at any location along, or between the entirety of, the physical interface between portions of tip member 200 and post 227 of blade structure 220. First metallurgical bond 250, after being formed, may take the form of a metallic cap (e.g., a welded cap) positioned on the top of post 227 and joining post 227 to second surface 206 of tip member 200. In some cases, the disclosure may include forming a second metallurgical bond 252 between tip member 200 and outboard end 224 of blade structure 220. First and second metallurgical bonds 250, 252 may be formed by one or more applications of the same metallurgical bonding technique, or may each be formed by a different process. As discussed elsewhere herein, tip member 200 may include a laser-sintered metal and post 227 may be formed of a cast metal. Although these metals may have different properties, they still may be coupled together through one or more currently known or later developed techniques of forming a bond between two metallic substances.

According to one example, metallurgical bond(s) 250, 252 may be formed by welding tip member 200 to blade structure 220. Welding refers to a process by which two metals are joined together by the application of heat. Example welding processes may include gas welding, arc welding, and/or resistance welding. Welding of metals generally requires that the original metallic structures (e.g., tip member 200 and blade structure 220) be melted to form a bond along their region(s) of contact. In this case, tip member 200 and blade structure 220 may each include a weldable metal capable of melting at elevated temperatures, e.g., during a welding treatment. Metallurgical bond(s) 250, 252 may alternatively be formed by brazing. Brazing refers to a process of forming a filler metal (e.g., copper and zinc) between two other metals, and then soldering the metals to melt each metallic substance and mechanically couple the original two metals to each other through the filler metal. In this case, tip member 200 and blade structure 220 may include one or more metals suitable for being joined by brazing. It is understood that any other currently known or later developed process may additionally or alternatively be used to mechanically couple tip member 200 to blade structure 220. Regardless of the technique(s) used to form metallurgical bond(s) 250, 252, the bonding of post 227 to tip member 200, and first surface 204 to outboard end 224 may occur subsequently to each other or simultaneously.

Figure 12:
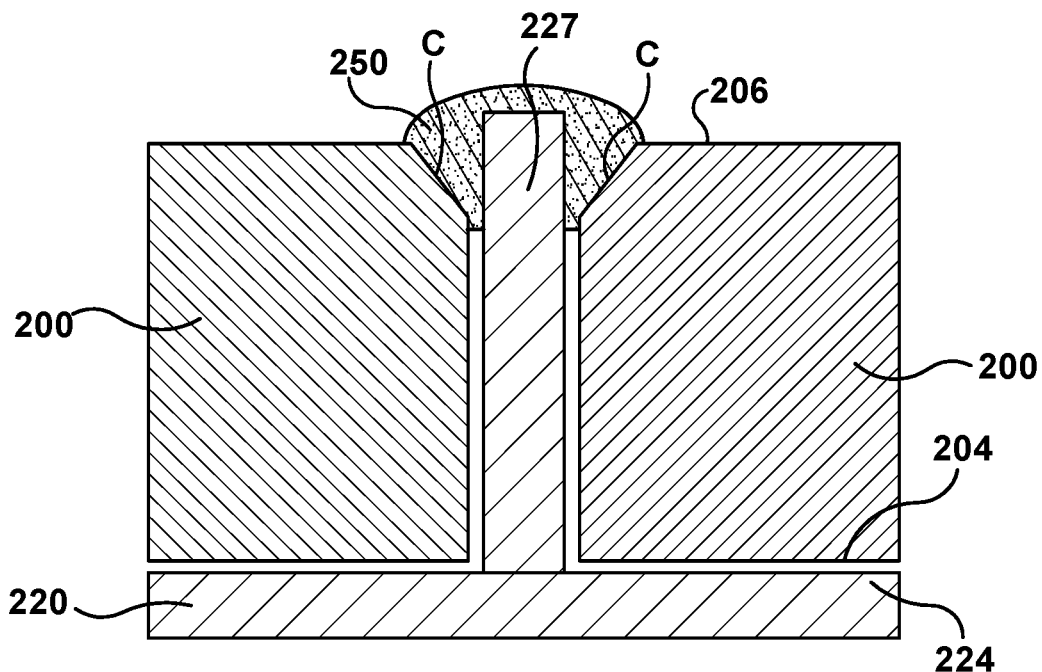
FIG. 12 shows a cross-sectional view of an opening with countersunk features, and a post positioned thereon, according to embodiments of the disclosure.

Referring to FIG. 12, opening(s) 210 may include additional structural features to enhance the forming of metallurgical bond(s) 250, 252 between tip member 200 and post(s) 227. As shown, opening(s) 210 may include a set of countersunk regions C positioned at first and/or second surface(s) 204, 206. Countersunk regions C may provide opening(s) 210 with a dilating internal area to provide more space where metallurgical bond(s) 250, 252 may be formed. The additional space created from countersunk regions C, and the forming of metallurgical bond(s) 250, 252 therein, may increase the strength of mechanical bonds between tip member 200 and post(s) 227 when forming a turbomachine component according to the present disclosure.

Figure 13:
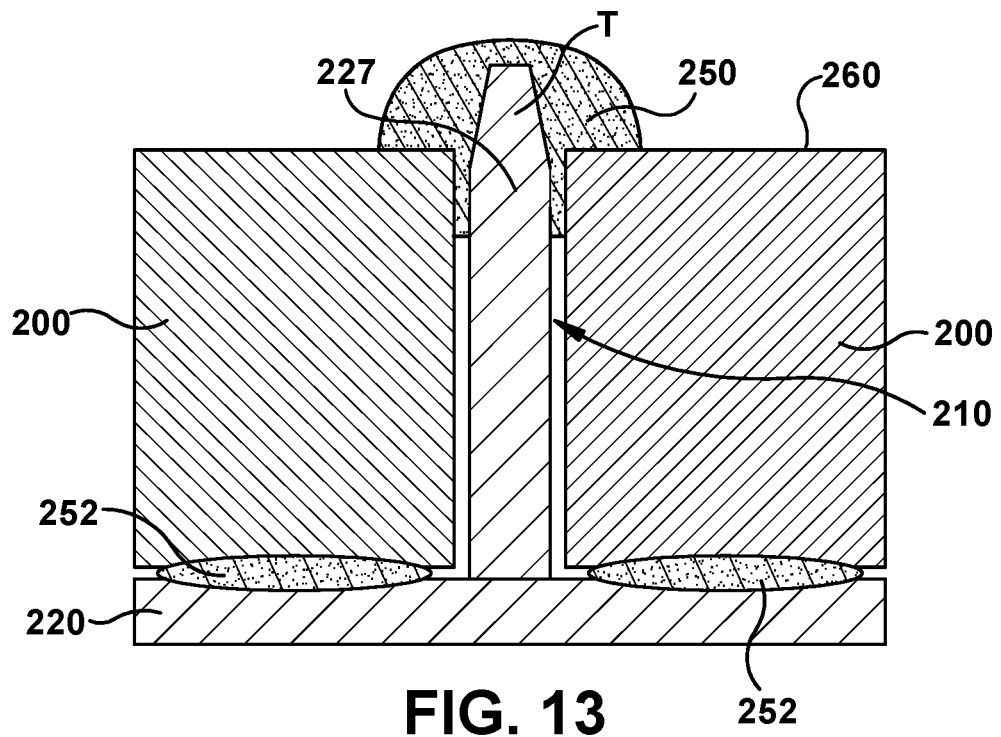
FIG. 13 shows a cross-sectional of a post with a tapered end positioned within an opening according to embodiments of the disclosure.

Turning now to FIG. 13, post(s) 227 may include additional structural features in addition or alternatively to structural features of opening(s) 210 discussed herein. Specifically, post(s) 227 may feature a tapered end T proximate first and/or second surface(s) 204, 206 of tip member 200. Tapered end T may cause post 227 to have a narrowing surface area at the location where metallurgical bond(s) 250, 252 are formed. The additional space provided by tapered end T may increase the size of metallurgical bond(s) 252, 252 between tip member 200 and post 227 when forming a turbomachine component as compared embodiments of post 227 which do not include tapered end(s) T. Although countersunk regions C and tapered end(s) T of post 227 are shown separately in FIGS. 12 and 13, it is understood that these features of opening(s) 210 and tapered end(s) T may be used together. Furthermore, it is understood that opening(s) 210 and/or post(s) 227 may include other structural features to provide additional space or "pockets" to be filled with metallurgical bond(s) 250, 252. It is also understood that opening(s) 210 and/or post(s) 227 may also include various interlocking features to provide additional mechanical support between tip member 200 and post 227, e.g., as discussed elsewhere herein.

Figure 14:
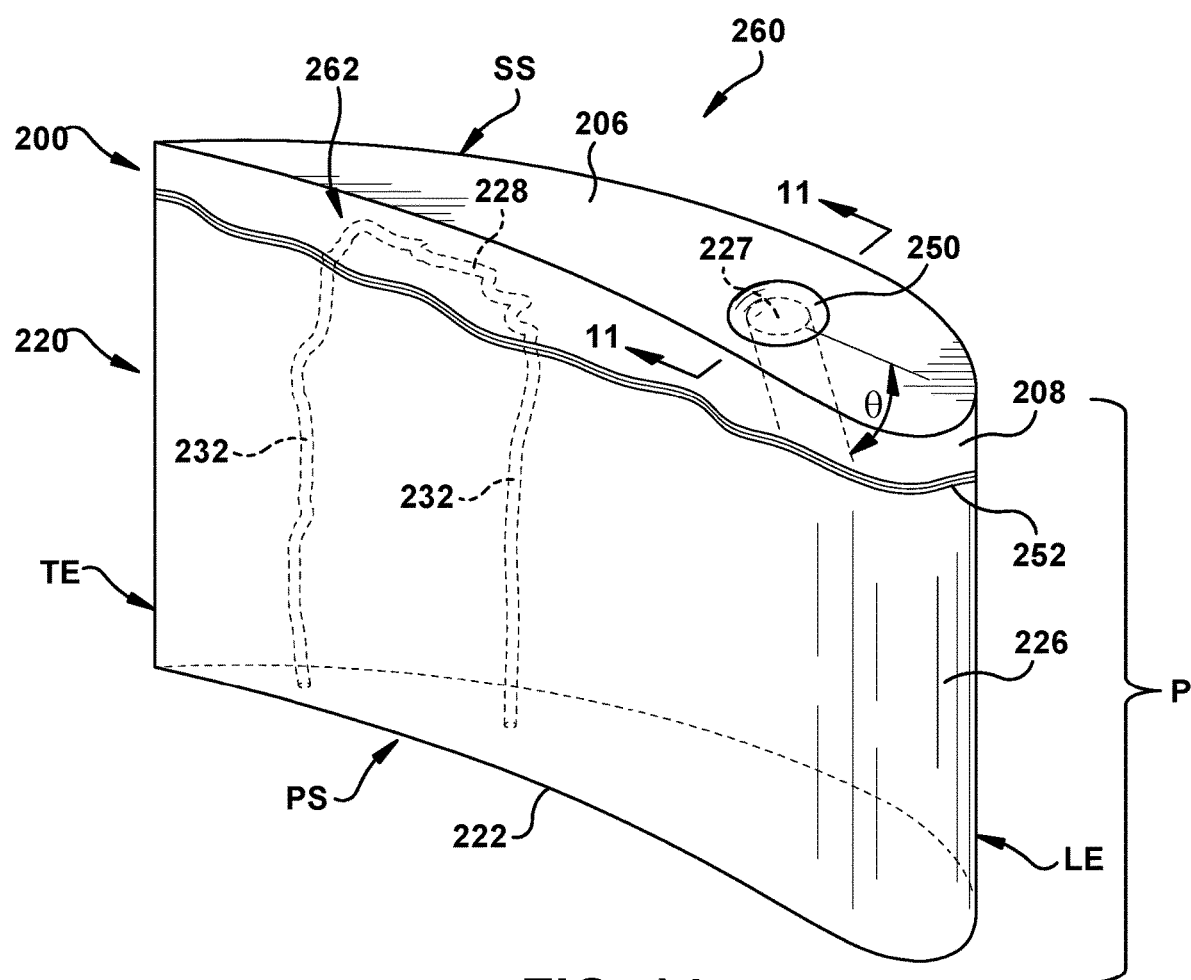
FIG. 14 shows a perspective view of an assembled turbomachine component with metallurgical bonds between the tip member and blade structure according to embodiments of the disclosure.

Turning now to FIG. 14, a turbomachine component 260 according to the disclosure may include tip member 200 mechanically coupled to blade structure 220. Turbomachine component 260 may be produced by forming first metallurgical bond 250 between post 227 and tip member 200, and second metallurgical bond 252 between tip member 200 and blade structure 220. According to an example, post 227 may have a non-perpendicular orientation represented by angle θ with respect to the plane of second surface 206. Post 227 being oriented non-perpendicularly with respect to second surface 206 (e.g., in the direction of angle θ as shown) may enhance the mechanical coupling between post 227 and tip member 200. For instance, non-perpendicular orientations (e.g., that of angle θ) may increase the total contact area between post 227 and the sidewalls of opening 210, thereby creating additional space to form metallurgical bond(s) 250 between post 227 and tip member 200. Additionally, orienting opening 210 and post 227 in a non-perpendicular direction (e.g., that of angle θ) may provide a stronger mechanical lock between post 227 and tip member 200, e.g., by revectoring mechanical sensitivity to external forces along the direction of post 227 instead of the radial orientation of blade structure 220. External forces acting on tip member 200 and blade structure 220 are not likely to have a resultant vector with the same orientation of post 227, and thus impeded from separating blade structure 220 from tip member 200.

Turbomachine component 260 may include a single airfoil profile P extending over tip member 200 and blade structure 220. Single airfoil profile P may be free of structural discontinuities, gaps, non-continuous surfaces, etc., particularly where second metallurgical bond 252 is formed. As shown, single airfoil profile P may include perimeter sidewall 208 of tip member 200 in addition to airfoil portion 226 of blade structure 220, without these regions forming distinct airfoil profiles. Turbomachine component 260 thus may include leading edge LE, trailing edge TE, pressure side surface PS, and suction side surface SS as discussed elsewhere herein. The coupling of tip member 200 to blade structure 220 thus may provide turbomachine component 260 adapted for use in the flowpath of a turbomachine. Tip member 200 may be selected and mechanically coupled to blade structure 220 based on the characteristics of a particular turbomachine or flowpath where turbomachine component 260 is deployed.

In addition to the various exterior features discussed above, turbomachine component 260 may also include interior features (e.g., cooling circuits and/or other internal structures) formed by portions of tip member 200 and blade structure 220. For example, turbomachine component 260 may include, e.g., one or more cooling circuits 262 forming by the fluid connection between first cooling passage(s) 228 in tip member 200 and second cooling passage(s) 232 in blade structure 220. During operation, a cooling fluid delivered to tip member 200 and/or blade structure 220 may pass through cooling circuit 262 to extract heat from turbomachine component 260, without requiring separate cooling passages and/or circuits in tip member 200 and blade structure 220. It is also understood that tip member 200 and/or blade structure 220 may additionally or alternatively be manufactured to include independent cooling circuits therein.

Embodiments of the disclosure provide technical and commercial advantages, some of which are discussed herein for the sake of example. The process of forming metallurgical bond(s) 250, 252 between tip member 200 and blade structure 220 may provide a removable mechanical connection when forming turbomachine component 260. At the time of repair, servicing, etc., metallurgical bond(s) 250, 252 can be selectively destroyed (e.g., by directional heat treatment and/or similar processes) so that tip member 200 may be separated from blade structure 220. A new tip member 200 then may be placed on blade structure 220 and mechanically coupled thereto. The new tip member 200 may include similar or different characteristics from the previously-used tip member 200. This process is distinct from conventional servicing of turbomachine components (e.g., blades) which may rely on metal cladding to remove or repair damaged pieces of a structure. The process of forming tip member(s) 200 from additive manufacture may also provide larger variation in blade geometries, and at less cost, than forming an entire blade structure from a cast metal. Embodiments of the disclosure also provide a strong mechanical connection between laser-sintered metals (e.g., in tip member 200) and cast metals (e.g., in blade structure 220) by allowing multiple metallurgical bonds to be formed along multiple structural interfaces. By contrast, conventionally formed modular blade portions may rely on a single perimeter weld or other forms of mechanical connection at only one point of contact.

It should be noted that in some alternative implementations, the acts described may occur out of the order noted or, for example, may in fact be executed substantially concurrently or in the reverse order, depending upon the act involved. Also, one of ordinary skill in the art will recognize that additional processes may be added.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A tip member configured to be coupled to a blade structure for a turbomachine, the tip member comprising:
   a body including:
      a first surface configured to engage a radially outboard end of the blade structure,
      a second surface positioned opposite the first surface, and
      at least one perimeter sidewall positioned between the first and second surfaces, wherein the at least one perimeter sidewall has an airfoil cross-section; and
   an opening passing through the body from the first surface to the second surface, and having a single directional orientation therebetween, wherein the opening is sized to receive a post positioned on the radially outboard end of the blade structure.

2. The tip member of claim 1, further comprising a first cooling passage formed within the body, the first cooling passage being configured to transmit a cooling fluid therethrough.

3. The tip member of claim 2, further comprising a connecting passage to the first cooling passage positioned at the first surface of the body, and wherein the connecting passage is configured to fluidly connect the first cooling passage to a second cooling passage formed within the blade structure.

4. The tip member of claim 1, wherein the body comprises a laser-sintered metal.

5. The tip member of claim 1, wherein the single directional orientation of the opening is non-perpendicular with respect to the first surface of the body.

6. The tip member of claim 1, further comprising a first metallurgical bond mechanically coupling the body to the post, wherein the first metallurgical bond is positioned at least partially between the post and the second surface of the body.

7. The tip member of claim 6, further comprising a second metallurgical bond mechanically coupling the first surface of the body to the radially outboard end of the blade structure.

8. A turbomachine component comprising:
   a blade structure having a root, a radially outboard end positioned opposite the root, and an airfoil portion extending between the root and the radially outboard end;
   a post coupled to the radially outboard end of the blade structure, and extending at least partially radially outward relative to the blade structure; and a tip member positioned on the blade structure, wherein the tip member includes:
- a first surface engaging the radially outboard end of the blade structure;
- a second surface positioned opposite the first surface,
- at least one perimeter sidewall positioned between the first and second surfaces, wherein the at least one perimeter sidewall of the tip member and the airfoil portion of the blade structure form a single airfoil profile, and
- an opening passing through the tip member from the first surface to the second surface, and having a single directional orientation therebetween, wherein the post is positioned within the opening of the tip member.

9. The blade structure of claim 8, further comprising:
a first cooling passage formed within the tip member and configured to transmit a cooling fluid therethrough, wherein the first cooling passage includes a connecting passage at the first surface of the tip member; and
a second cooling passage formed within the blade structure, wherein the connecting passage of the first cooling passage fluidly connects the first cooling passage to the second cooling passage.

10. The blade structure of claim 8, wherein the tip member comprises a laser-sintered metal, and wherein the blade structure comprises a cast metal.

11. The blade structure of claim 8, wherein the post is oriented non-perpendicularly with respect to the radially outboard end of the blade structure, and wherein the single directional orientation of the opening is non-perpendicular with respect to the first surface of the tip member.

12. The blade structure of claim 8, further comprising:
a first metallurgical bond mechanically coupling the tip member to the post, wherein the first metallurgical bond is positioned at least partially between the post and the second surface of the body; and
a second metallurgical bond mechanically coupling the first surface of the tip member to the radially outboard end of the blade structure.

13. The blade structure of claim 8, wherein the post comprises an internal rib of the blade structure.

14. The blade structure of claim 8, wherein the post is positioned on an impingement cap at the radially outboard end of the blade structure.

15. A method of forming a turbomachine component, the method comprising:
providing a tip member, the tip member including:
- a first surface configured to engage an outboard end of a blade structure,
- a second surface positioned opposite the first surface,
- at least one perimeter sidewall positioned between the first and second surfaces, wherein the at least one perimeter sidewall has an airfoil cross-section, and
- an opening passing through the tip member from the first surface to the second surface, and having a single directional orientation therebetween, wherein the opening is sized to receive a post positioned on the outboard end of the blade structure;

positioning the post of the blade structure through the opening of the tip member to mount the tip member on the outboard end of the blade structure; and
mechanically coupling the second surface of the tip member to the post to form the turbomachine component.

16. The method of claim 15, wherein mechanically coupling the tip member to the post comprises forming a metallurgical bond between the tip member and the post.

17. The method of claim 15, further comprising mechanically coupling the first surface of the tip member to the outboard end of the blade structure.

18. The method of claim 17, wherein mechanically coupling the first surface of the tip member to the outboard end of the blade structure includes forming a metallurgical bond between the first surface of the tip member and the outboard end of the blade structure.

19. The method of claim 15, wherein the tip member comprises a laser-sintered metal, and wherein the blade structure comprises a cast metal.

20. The method of claim 15, wherein the single directional orientation of the opening is non-perpendicular with respect to the first surface of the tip member.

* * * * *